United States Patent
Wright (10) Patent No.: US 7,292,542 B2
(45) Date of Patent: Nov. 6, 2007

(54) METHOD FOR TRAFFIC ENGINEERING OF CONNECTIONLESS VIRTUAL PRIVATE NETWORK SERVICES

(75) Inventor: Steven Allan Wright, Roswell, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 982 days.

(21) Appl. No.: 10/382,258

(22) Filed: Mar. 5, 2003

(65) Prior Publication Data
US 2004/0174884 A1    Sep. 9, 2004

(51) Int. Cl.
*H04L 12/28* (2006.01)

(52) U.S. Cl. .......... 370/256; 370/395.21; 370/408; 370/477

(58) Field of Classification Search .......... 370/477, 370/389, 392, 256, 395.41, 400, 397, 395.2, 370/395.21, 408
See application file for complete search history.

(56) References Cited

U.S. PATENT DOCUMENTS

| | | | |
|---|---|---|---|
| 6,522,627 B1 | | 2/2003 | Mauger ............ 370/230 |
| 6,563,793 B1* | | 5/2003 | Golden et al. ............ 370/236 |
| 6,665,273 B1* | | 12/2003 | Goguen et al. ............ 370/252 |
| 6,721,270 B1* | | 4/2004 | Mitra et al. ............ 370/230 |
| 6,765,873 B1* | | 7/2004 | Fichou et al. ............ 370/235 |
| 6,795,445 B1* | | 9/2004 | Kabie et al. ............ 370/401 |
| 6,914,883 B2* | | 7/2005 | Dharanikota ............ 370/230.1 |
| 6,959,335 B1* | | 10/2005 | Hayball et al. ............ 709/227 |
| 2002/0126681 A1 | | 9/2002 | Kazban et al. ............ 370/409 |
| 2003/0177221 A1* | | 9/2003 | Ould-Brahim et al. ...... 709/223 |
| 2004/0081137 A1* | | 4/2004 | Hassan-Ali et al. ........ 370/352 |
| 2004/0213221 A1* | | 10/2004 | Civanlar et al. ............ 370/389 |
| 2004/0213257 A1* | | 10/2004 | Abdelilah ............ 370/395.1 |
| 2005/0271038 A1* | | 12/2005 | Xin et al. ............ 370/351 |

* cited by examiner

*Primary Examiner*—Min Jung
(74) *Attorney, Agent, or Firm*—Cantor Colburn LLP (57) ABSTRACT

A method for traffic engineering of connectionless virtual private network (VPN) services. The method comprises receiving physical connectivity data for a connectionless VPN including service nodes and links between the service nodes. One or more of the service nodes are also edge nodes. Logical connectivity data for the edge nodes is received. A restricted topology is created in response to the physical connectivity data and to the logical connectivity data. The restricted topology includes a single path between each pair of the edge nodes and each path includes a plurality of the service nodes and one or more of the links. A bandwidth requirement for each link in the restricted topology is calculated. The bandwidth requirement is reserved on each link in the restricted topology. The method further comprises directing routing software to force a packet received from an edge node through one of the paths in the restricted topology.

23 Claims, 5 Drawing Sheets

METHOD FOR TRAFFIC ENGINEERING OF CONNECTIONLESS VIRTUAL PRIVATE NETWORK SERVICES

BACKGROUND OF THE INVENTION

The present disclosure relates generally to traffic engineering of connectionless virtual private network (VPN) services and in particular, to a method of traffic engineering that can be utilized to provide a quality of service guarantee on a connectionless VPN service.

Many corporations utilize connectionless VPNs to provide communication between offices and plants that are located in different geographic locations. A VPN may be implemented in a variety of manners, including building a VPN on top of an existing asynchronous transfer mode (ATM) network and building a VPN directly over the Internet. Typically, each geographic location within a VPN includes a firewall and a network means to access the other geographic locations covered by the VPN (e.g., a tunnel between each geographic location within the VPN). A VPN may provide a connectionless or connection-oriented service. A connectionless service is often compared to a postal system and refers to a network service where each packet carries a full destination address and each packet is routed through the network independently of other packets within the network. This is contrasted with a connection-oriented service, where a requesting node establishes a connection with a receiving node, sends data via the connection and then discontinues the connection. Both types of network services, connectionless and connection-oriented, may be characterized by a quality of service (QoS) metric, or guarantee.

The basic technique for providing QoS guarantees is the allocation of network resources along the path of the service instance. Typically, the network resource allocation is summarized as the bandwidth allocation for that service on a link, or path. Bandwidth allocation is a fundamental requirement for a variety of QoS guarantees. For example, guarantees on bandwidth, latency, loss and jitter all require, at a minimum, that bandwidth can be guaranteed. This works for connection-oriented services, but has problems for connectionless services where the path must be defined on a packet-by-packet basis. There is no formally standardized solution that provides a mechanism to dimension the connectionless network. Generally, the connectionless network is considered as a "cloud" network and link bandwidths are upgraded individually as the traffic load reaches critical thresholds. QoS approaches (e.g., Differentiated Services) require dimensioning for bandwidth across the whole network as they decouple from the routing. In layer 3 VPNs (e.g., RFC 2547 style VPNs) the traffic between the endpoints of the VPN is restricted to a logical mesh between those endpoints. A similar approach may be utilized for layer 2 VPNs in the context of virtual private LAN service (VPLS). One approach to a QoS extension is to reserve bandwidth along each of those logical paths in the logical mesh of endpoint connections. The mesh of connections could be implemented by a variety of tunneling mechanisms such as multi protocol label switching (MPLS), generic routing encapsulation (GRE) and internet protocol security protocol (IPsec).

A drawback to reserving bandwidth along each of the logical paths in the logical mesh is that the bandwidth reservation requirements scale with the number of endpoints. In order to guarantee bandwidth for a connectionless service, it must be possible to guarantee bandwidth between each of the endpoints, or edge nodes within the network. For example, a first edge node may have a maximum bandwidth to the network of one-hundred megabits per second (Mb/s) and it may be necessary to dimension the network such that those one-hundred Mb/s can be delivered to any other edge node in the connectionless network. One way to do this is to reserve bandwidth for each direct path between the first edge node and each other edge node. For example, if three other edge nodes exist in the network, this would require three-hundred Mb/s to be reserved through the network even though the first edge node can only send a maximum of one-hundred Mb/s. As the number of edge nodes becomes large, the amount of bandwidth required to be reserved based on each of the logical paths in the logical mesh may not be physically available on the links within the connectionless VPN.

BRIEF DESCRIPTION OF THE INVENTION

The above discussed and other drawbacks and deficiencies of the prior art are overcome or alleviated by a method for traffic engineering of connectionless virtual private network (VPN) services. In an exemplary embodiment, the method comprises receiving physical connectivity data for a connectionless VPN including service nodes and links between the service nodes. One or more of the service nodes are also edge nodes. Logical connectivity data for the edge nodes is received. A restricted topology is created in response to the physical connectivity data and to the logical connectivity data. The restricted topology includes a single path between each pair of the edge nodes and each path includes a plurality of the service nodes and one or more of the links. A bandwidth requirement for each link in the restricted topology is calculated. The bandwidth requirement is reserved on each link in the restricted topology. The method further comprises directing routing software to force a packet received from an edge node through one of the paths in the restricted topology.

In another aspect, a computer program product for traffic engineering of connectionless VPN services comprises a storage medium readable by a processing circuit and storing instructions for execution by the processing circuit for performing a method. The method comprises receiving physical connectivity data for a connectionless VPN including service nodes and links between the service nodes. One or more of the service nodes are also edge nodes. Logical connectivity data for the edge nodes is received. A restricted topology is created in response to the physical connectivity data and to the logical connectivity data. The restricted topology includes a single path between each pair of the edge nodes and each path includes a plurality of the service nodes and one or more of the links. A bandwidth requirement for each link in the restricted topology is calculated. The bandwidth requirement is reserved on each link in the restricted topology. The method further comprises directing routing software to force a packet received from an edge node through one of the paths in the restricted topology.

In a further aspect, a computer usable medium storing a computer program for directing network hardware to perform a method comprising receiving physical connectivity data for a connectionless VPN including service nodes and links between the service nodes. One or more of the service nodes are also edge nodes. Logical connectivity data for the edge nodes is received. A restricted topology is created in response to the physical connectivity data and to the logical connectivity data. The restricted topology includes a single path between each pair of the edge nodes and each path includes a plurality of the service nodes and one or more of the links. A bandwidth requirement for each link in the restricted topology is calculated. The bandwidth requirement is reserved on each link in the restricted topology. The method further comprises directing routing software to force a packet received from an edge node through one of the paths in the restricted topology.

BRIEF DESCRIPTION OF THE DRAWINGS

Referring to the exemplary drawings wherein like elements are numbered alike in the several FIGURES.

DETAILED DESCRIPTION OF THE INVENTION

An embodiment of the present invention is directed to the dimensioning and service functionality requirements to implement connectionless VPN services with bandwidth QoS guarantees. Briefly, an embodiment of the present invention provides enhanced bandwidth scaling properties by forcing the logical paths to follow a restricted topology, where a single path exists between each pair of edge nodes within the VPN. This is contrasted to a full mesh approach where multiple paths may exist between each pair of edge nodes. The restricted topology for the VPN may be implemented with a variety of mechanisms or technologies as long as it meets two objectives: first, that the logical mesh of connections is forced to run through the restricted topology; and second, that the restricted topology provides bandwidth guarantees. The bandwidth guarantees of the restricted topology may be designed to ensure adequate bandwidth for the service. The dimensioning approach can scale with the number of nodes in the VPN. Using an embodiment of the present invention to dimension the network, the bandwidth guarantees may be engineered to support an arbitrary degree of over-subscription of network resources, and therefore, effectively scaling at a rate less than the number of nodes.

Figure 1:
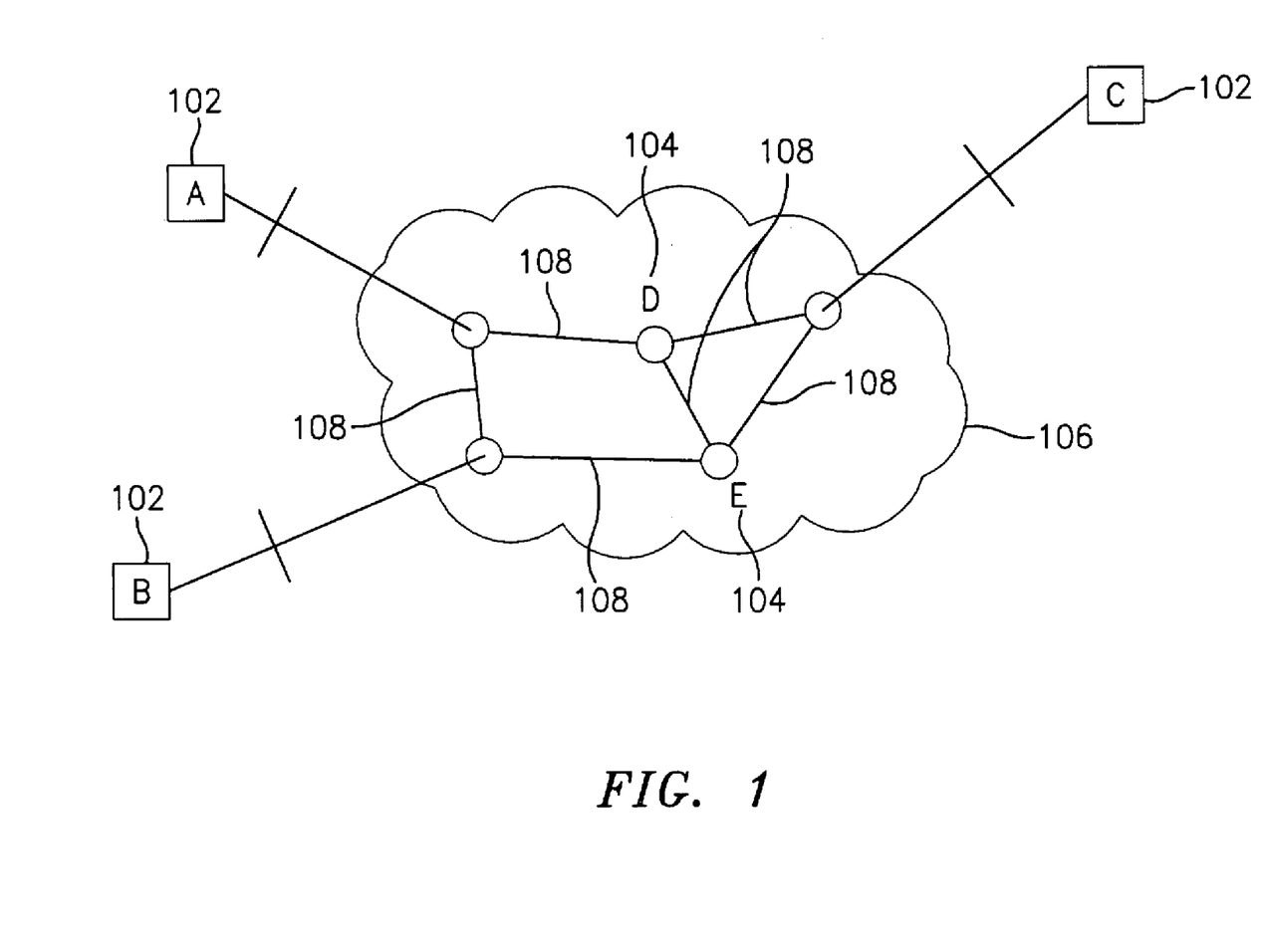
FIG. 1 is a block diagram of the physical connectivity included in an exemplary connectionless VPN.

The basic physical components utilized to provide the connectionless service in an exemplary embodiment of the present invention are depicted in FIG. 1. FIG. 1 includes several edge nodes 102, service nodes 104, a VPN 106 and internal transport links 108. The edge nodes 102 are a special class of service nodes 104 that interface directly to the customer. The edge nodes 102 include all the properties discussed with respect to service nodes 104 because they are a subset of service nodes 104. The links 108 are considered to be transport links that provide a fixed bandwidth transport service between the service nodes 104 (including the edge nodes 102). Shown in FIG. 1, are all the physical links 108 in the VPN 106 and therefore all the possible physical routes for sending packets through the VPN 106. In an exemplary embodiment, the links 108 are provided by a gigabit Ethernet. Alternate embodiments include any link technology known in the art including using a synchronized optical network (SONET) to provide the links 108 and virtual circuits with bandwidth guarantees through an ATM network to provide the links 108. The service nodes 104, including the edge nodes 102, provide the connectionless service. In an exemplary embodiment, the connectionless VPN service includes packet-by-packet routing for a layer 3 service, or alternatively, an emulated VPLS for a layer 2 service. The service nodes 104, including the edge nodes 102, make routing and forwarding decisions for the packetized data traffic. The service nodes 104 are the points in the VPN 106 where queuing of packets may occur, as packets arriving at a service node 104 from several ingress links 108 contend for service on a single egress link 108. Service nodes 104 may be implemented utilizing any hardware known in the art to provide service node 104 functions such as such as Ethernet switches and IP routers.

Figure 2:
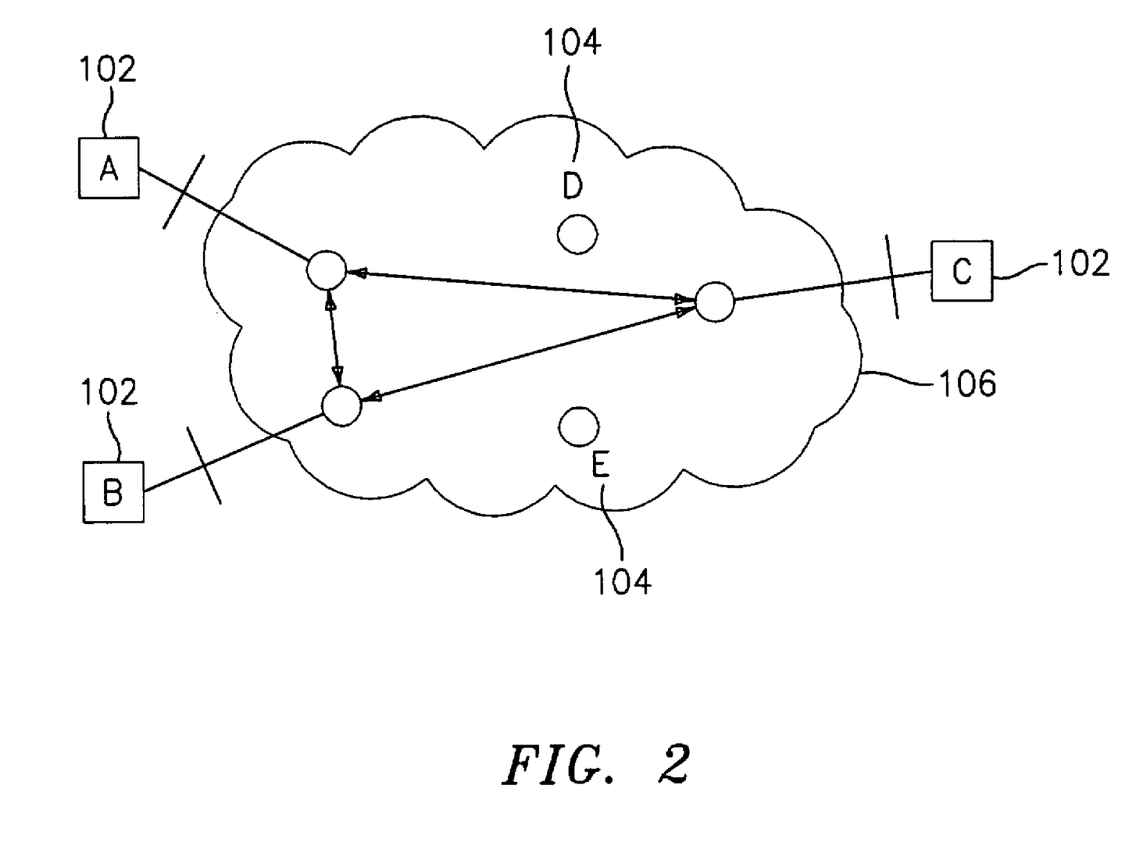
FIG. 2 is a block diagram of an exemplary logical connectivity mesh associated with the connectionless VPN depicted in FIG. 1.
Figure 3:
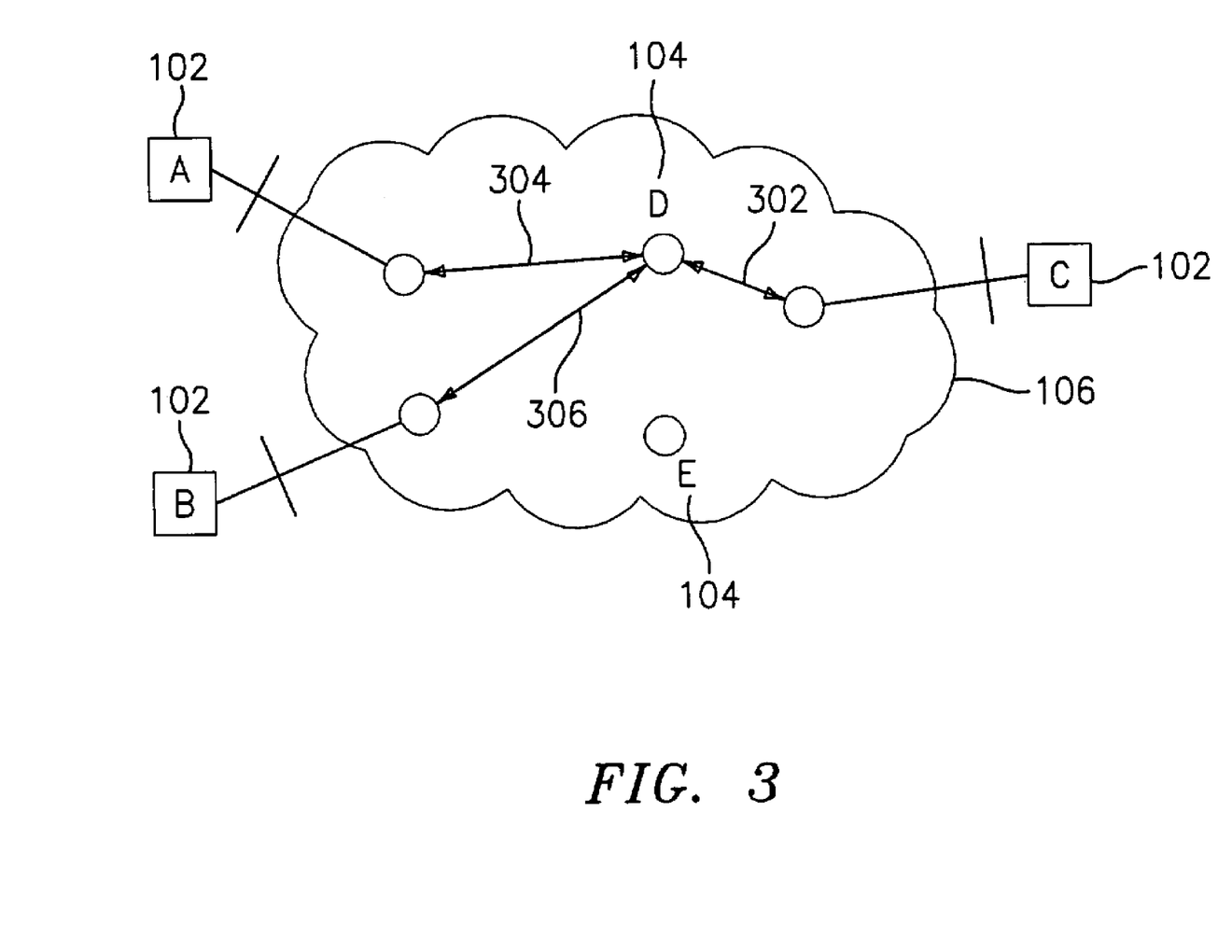
FIG. 3 is a block diagram of an exemplary logical connectivity mesh constrained to a specific topology associated with the connectionless VPN depicted in FIG. 1.

FIG. 2 is a block diagram of an exemplary logical connectivity mesh associated with the connectionless VPN network depicted in FIG. 1. As depicted in FIG. 2, all three edge nodes 102, labeled "A", "B" and "C" communicate with each other through the VPN 106. FIG. 2 illustrates the logical connectivity without regard to the physical implementation. If a full logical mesh approach was implemented, then the logical connectivity would mirror the physical connectivity depicted in FIG. 1. Using a full logical mesh approach may result in a requirement to reserve more bandwidth than is required and is available. For example, if each link had a bandwidth requirement of "x and a bandwidth QoS was to be provided, then each link 108 would be required to reserve a bandwidth of "x" for exclusive use by the VPN. FIG. 3 is a block diagram of an alternate exemplary logical connectivity mesh that is constrained to a specific restricted topology (e.g., a virtual topology) through the physical VPN 106 depicted in FIG. 1. The restricted topology depicted in FIG. 3 is implemented utilizing the underlying service nodes 104, including the edge nodes 102, and links 108 depicted in FIG. 1. All packets within the VPN 106 from edge nodes 102 "A", "B" and "C" travel along a subset of the links 302, 304 and 306. Bandwidth is reserved along this subset of links to support a bandwidth QoS. As depicted in FIG. 3, a single path is created between each pair of edge nodes 102.

The exemplary virtual topology, or restricted topology, depicted in FIG. 3 is selected to minimize the amount of bandwidth reserved on the links 108 to provide a bandwidth QoS. For example, the logical connectivity from edge node 102 "A" to edge node 102 "B" and from edge node 102 "A" to edge node 102 "C" share the same link 304 from edge node 102 "A" to service node 104 "D". Consider that the bandwidth requirement from edge node 102 "A" to edge node 102 "B" is "x" Mb/s and from edge node 102 "A" to edge node 102 "C" is "y" Mb/s. One way to calculate the required reserved bandwidth from the edge node 102 "A" to service node 104 "D" is to reserve "x+y" Mb/s. In contrast, an exemplary embodiment of the present invention calculates the required reserved bandwidth as the maximum of "x" and "y" because it recognizes that there is maximum bandwidth that can be generated from edge node 102 "A" traversing the link 304 to service node 104 "D". Similarly, the logical connectivity from edge node 102 "B" to edge node 102 "A" and from edge node 102 "B" to edge node 102 "C" share the same link 306 from edge node 102 "B" to service node 104 "D". Therefore, the reserved bandwidth is calculated to be the maximum of the required bandwidths from edge node 102 "B" to edge nodes 102 "A" and "C". In this manner, only the bandwidth actually required is reserved on the links 108.

In general, the restricted topology may be chosen to identify the required bandwidth and to provide guarantees for that bandwidth in the service architecture. The mechanism for providing bandwidth guarantees on the links 108 between the service nodes 104 (including the edge nodes 102) is implementation specific. In an exemplary embodiment of the present invention, ATM virtual circuits are dimensioned to the required bandwidth. In another exemplary embodiment of the present invention, traffic engineered tunnels are provisioned via MPLS. A key requirement for providing bandwidth guarantees is that the service nodes 104, including the edge nodes 102, provide the necessary queuing and link scheduling mechanisms to provide the bandwidth guarantees for each link. In addition, the service nodes 104 should have the ability to route the VPN traffic, and only the VPN traffic, over that allocated bandwidth. The bandwidth allocation at each link could specify a minimum bandwidth, or a maximum bandwidth, with different results for the aggregate, or end-to-end, service.

A variety of mechanisms may be utilized in an exemplary embodiment of the present invention to achieve route restriction. For example, the if the logical mesh is implemented as MPLS label switched paths (LSPs), the logical topology may be implemented as MPLS traffic engineered tunnels. The routing restrictions may be implemented in MPLS by "coloring" the traffic-engineered tunnels and restricting access to those colored routes to the VPN members. This is essentially a constrained routing problem for the mesh of LSPs, where they are constrained to only use the appropriately colored routes. Link coloring and constrained routing are well known capabilities of MPLS networks. For example, resource reservation protocol (RSVP) and constraint-based label distribution protocol (CRLDP) may be utilized to provide route restrictions in MPLS networks, and Ethernet protocols known in the art may be utilized to create a restricted topology (e.g., a tree structure) and perform routing.

Figure 4:
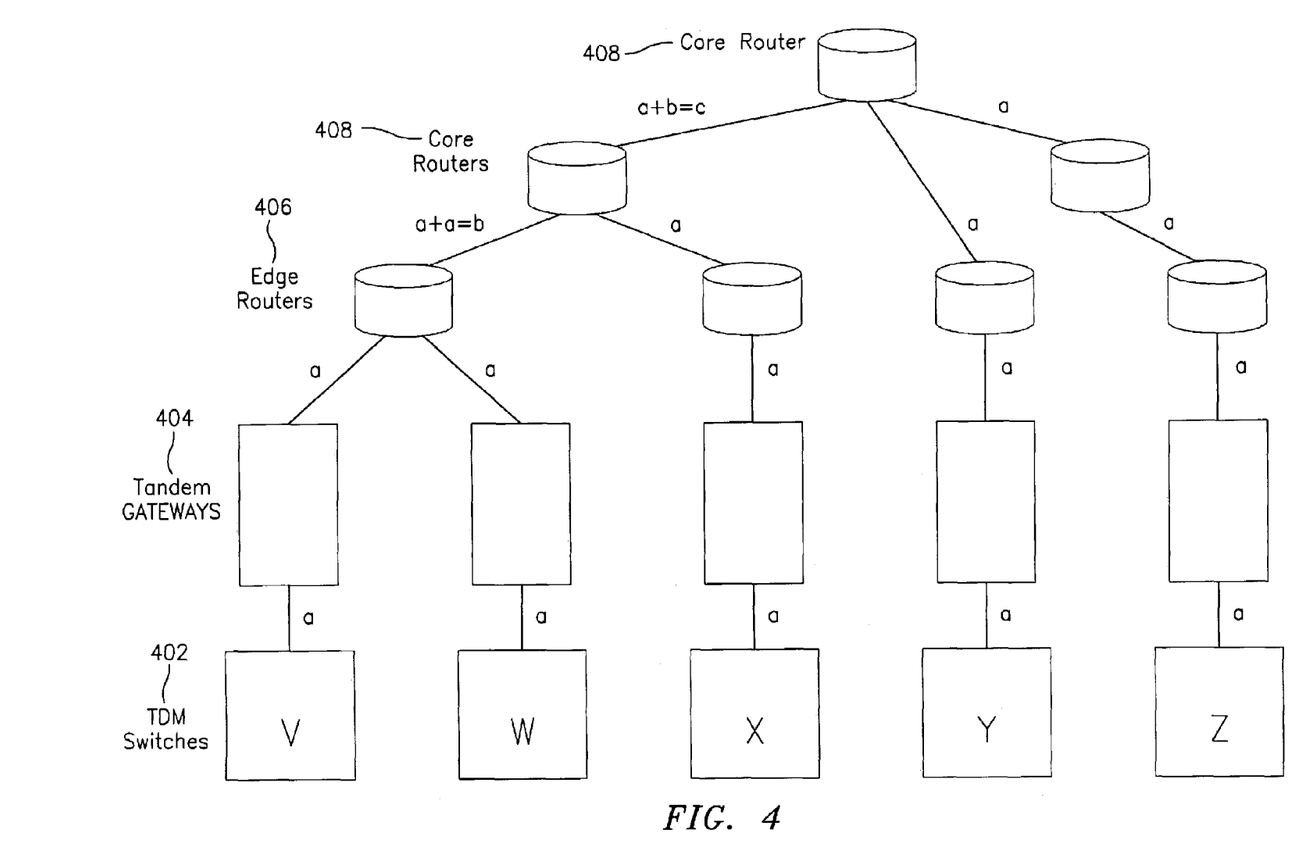
FIG. 4 is a block diagram of an exemplary tree structure that may be utilized as a logical connectivity mesh constrained to a specific topology.

FIG. 4 is a block diagram of an exemplary tree structure that may be utilized as a logical connectivity mesh constrained to a specific topology in an exemplary embodiment of the present invention. The tree structure depicted in FIG. 4 includes leaves that are the subscribers to a VPN, where the nodes of the tree are service nodes and the branches are transport links. In FIG. 4, the leaves, or edge nodes, are implemented utilizing tandem switches 402, and the service nodes are implemented using tandem gateways 404, edge routers 406 and core routers 408. As depicted in FIG. 4, the VPN participants are the tandem switches 402 that may be interconnected by a packet switched connectionless VPN with QoS guarantees on the minimum bandwidth. Each tandem switch 402 has a symmetric connection to the edge routers 406 (e.g., a L3 VPN a 1a RFC 2547) where the ingress bandwidth required to the packet network is equal to the egress bandwidth required from the packet network. In this example, the bandwidth requirement would correspond to the number of active calls that the tandem switch 402 could support over this interface. The tandem switches 402 may in general be able to support different numbers of calls, that is have different, but still symmetric access bandwidth into the connectionless VPN with QoS. For simplicity in this example, it is assumed that they are all the same size and require a symmetric bandwidth of "a" bits per second. If the bandwidth is asymmetric, more specifics would be required about the bandwidth in the ingress direction (edge to core) versus the bandwidth in the egress direction (core to edge). Because the bandwidth is symmetric at all edges in the exemplary embodiment depicted in FIG. 4, the bandwidth will be symmetric at all links though the tree and referring to the link bandwidth is specific enough.

In a simple tree structure the bandwidth of all the links is identical. In the exemplary embodiment depicted in FIG. 4, a "fat" tree structure is utilized. In a fat tree structure, the bandwidths on the links increase closer to the core routers 408. As depicted in FIG. 4, stringent QoS guarantees on bandwidth are supported because the link bandwidth between the edge routers 406 and the next level in the tree is the sum of the bandwidths from the VPN participants attached to that edge node. This is depicted in FIG. 4, where the link bandwidth between the tandem gateways 404 and the edge routers 406 is "a" and the link bandwidth between the edge router 406 and the core routers 408 is "a+a", or "b". Similarly, the link bandwidth between the core routers is "c". In an alternate embodiment, a less stringent QoS guarantee may be required (e.g., a statistical guarantee) and lesser bandwidth towards the core may be utilized. In this case, there is a reliance upon the user traffic statistics that may suggest that simultaneous peak usage by all edge nodes is unlikely. This provides a mechanism for engineering the degree of over-subscription of core network bandwidth.

The tree structure is not required to be regular in the sense that all nodes have the same degree or all leaves are the same depth from the core. The tree structure is loop free which may avoid a number of potential routing problems. The tree structure also matches the topology of real access networks and simplifies the bandwidth requirement calculations. The construction of the tree structured virtual topology may initially be manually configured on the switches and routers involved. Alternatively, the virtual topology creation may be automated. A variety of algorithms exist to generate such tree structures. For example, the tree could be constructed as a core based tree or a Steiner tree. Several protocols have been developed for generating such tree structures (e.g., spanning tree algorithm of Ethernet and various protocols for multicast trees).

In an alternate embodiment of the present invention, additional redundancy and/or resiliency is provided. The basic tree structure depicted in FIG. 4 does not take into account the various types of failures to which networks are subject. A variety of redundancy techniques may be used to enhance the virtual topology. To protect against link failures, each link could be made redundant by using a link-by-link protection scheme (e.g., SONET rings, Ethernet load shared multi-link groups like IEEE802.1ad). To protect against node failures, additional links and nodes may be deployed, along with the mechanisms and criteria for recognizing link and node failures and recovering from them. One approach is to utilize a completely node and link disjoint virtual topology. The two disjoint tree structures could be run in a load sharing mode or in an active standby mode. The nodes at which the two disjoint tree structures meet have to implement the load sharing or active/standby switching function. These nodes could be the service edge nodes of the carrier network, or the subscriber nodes. In addition, additional nodes may be added to the tree structure based on capacity requirements. For example, a tandem switch 402 may be bigger than the tandem gateway 404 that it is linked to and therefore, a second tandem gateway 404 linked to the tandem switch 402 may provide enhanced throughput.

Figure 5:
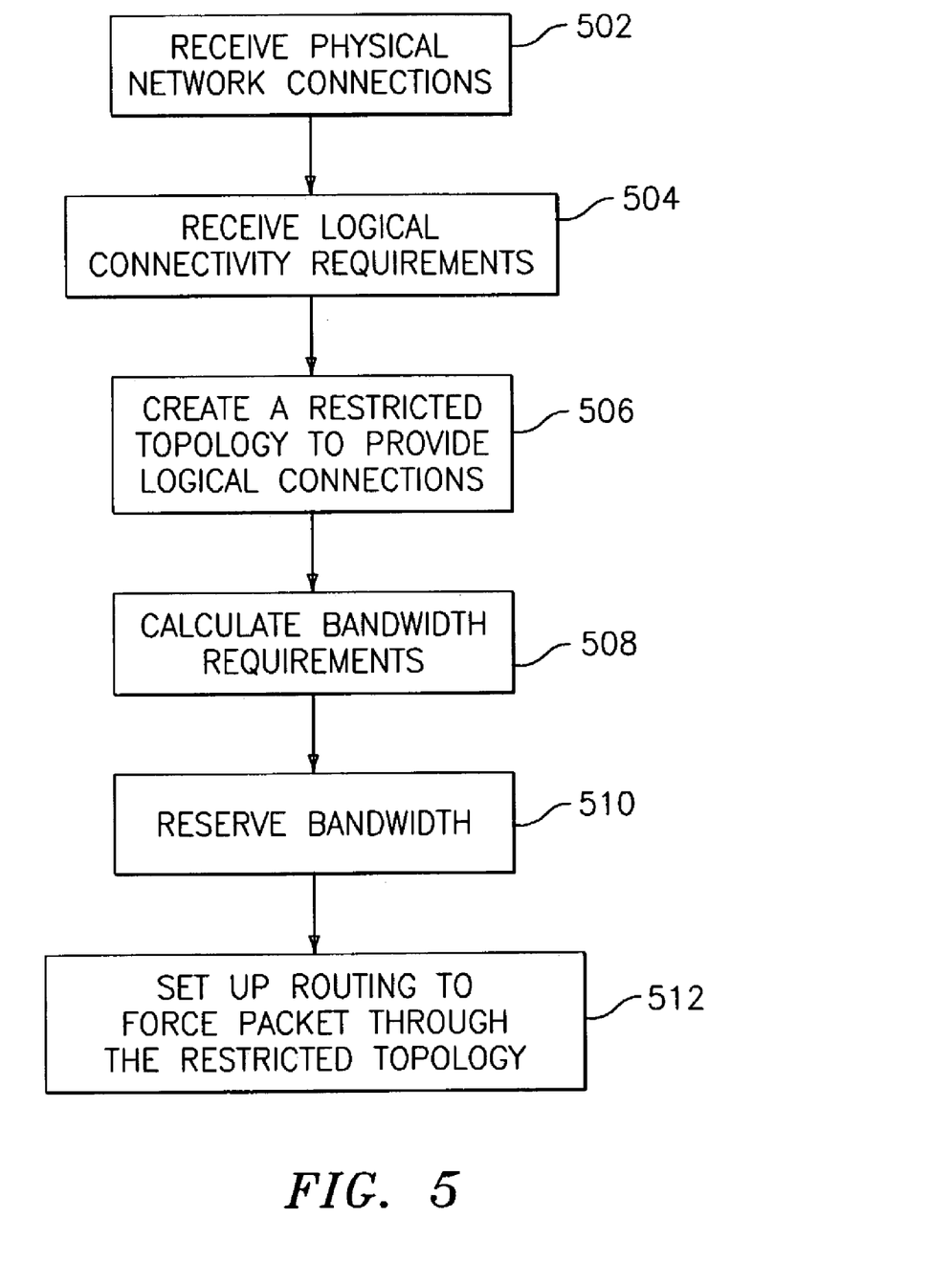
FIG. 5 is a flow diagram of an exemplary process for performing traffic engineering of a connectionless VPN service.

FIG. 5 is a flow diagram of an exemplary process for performing traffic engineering of connectionless VPN service. At step 502, the physical network connections, such as those depicted in FIG. 1, are received. The physical network connections may include data such as nodes and links included in the VPN. At step 504, the logical connectivity requirements are received. As discussed previously in reference to FIG. 2, the logical connectivity requirements are in terms of edge nodes and communication requirements between edge nodes. Step 506 includes creating a restricted topology to provide logical connections. As discussed previously with respect to FIGS. 3 and 4, this topology may be based on a tree structure and includes a single path between each pair of endpoints. Once the restricted topology is created in step 506, step 508 is performed to calculate bandwidth requirements on links within the restricted topology. At step 510, the required bandwidth is reserved and at step 512 routing software in directed to force packets within the VPN to be sent through the nodes in the restricted topology.

In addition, an embodiment of the present invention allows a bandwidth QoS to be supported in a connectionless VPN. An embodiment of the present invention may result in reducing the core bandwidth requirements when compared to a meshed approach. For a VPN of N nodes, each of bandwidth x, the mesh approach requires N(N−1)/2 paths of bandwidth x (i.e., the bandwidth requirement scales with the square of the number of VPN participants). In contrast, the maximum bandwidth between each level in the tree structure is N leaves of bandwidth x (i.e., the bandwidth scales linearly with the number of VPN participant for the tree topology case). The ability to provide a QoS guarantee with less reserved bandwidth may allow for more QoS bandwidth guarantees to be available due to the decreased cost in bandwidth. An embodiment of the present invention may be applied to the dimensioning of packet bandwidth to support the interconnection of packet tandem switches. The dimensioning approach of the present invention may also be applied to connectionless services in an access network, such as voice over IP (VoIP). A further embodiment of the present invention may be applicable for dynamic session based services where admission to these services with QoS guarantees is controlled on a session by session basis (e.g., video-on-demand, video conferencing).

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for traffic engineering of a connectionless virtual private network service, the method comprising:

receiving physical connectivity data for a connectionless virtual private network including service nodes and links between the service nodes, wherein one or more of the service nodes are also edge nodes, each edge node at a customer endpoint;

receiving logical connectivity data for the edge nodes;

creating a restricted topology in response to the physical connectivity data and to the logical connectivity data, wherein the restricted topology includes a single path between each pair of the edge nodes and wherein each path includes a plurality of the service nodes and one or more of the links;

calculating a bandwidth requirement for each link in the restricted topology;

reserving the bandwidth requirement on each link in the virtual private network; and directing routing software to force a packet received from one of the edge nodes through one of the paths in the restricted topology.

2. The method of claim 1 wherein the restricted topology is a tree structure.

3. The method of claim 2 wherein the tree structure is a fat tree structure.

4. The method of claim 1 further comprising providing a quality of service guarantee in response to reserving the bandwidth requirement.

5. The method of claim 4 wherein the quality of service guarantee is a bandwidth guarantee.

6. The method of claim 4 wherein the quality of service guarantee is a latency guarantee.

7. The method of claim 4 wherein the quality of service guarantee is a loss guarantee.

8. The method of claim 4 wherein the quality of service guarantee is a jitter guarantee.

9. The method of claim 1 wherein the packet is in multi protocol label switching format.

10. The method of claim 1 wherein the virtual private network is a layer two network.

11. The method of claim 1 wherein the virtual private network is a layer three network.

12. The method of claim 1 wherein calculating a bandwidth requirement results in an over subscription of the bandwidth requirement.

13. The method of claim 1 wherein calculating a bandwidth requirement results in an under subscription of the bandwidth requirement.

14. The method of claim 1 further comprising adding a redundant link and service node to one of the paths in the restricted topology.

15. The method of claim 1 wherein the routing software is based on constraint based label distribution protocol.

16. The method of claim 1 wherein the routing software is based on resource reservation protocol.

17. The method of claim 1 wherein the service nodes provide the necessary queuing and link scheduling mechanisms to provide the bandwidth requirement.

18. The method of claim 1 wherein the service nodes route traffic over the allocated bandwidth in response to the routing software.

19. The method of claim 1 wherein creating a restricted topology is performed manually.

20. The method of claim 1 wherein creating a restricted topology is automated.

21. A computer program product for providing traffic engineering of a connectionless virtual private network service, the computer program product comprising:
a computer readable storage medium readable by a processing circuit and storing computer executable instructions for execution by the processing circuit for performing a computer executable method comprising:
receiving physical connectivity data for a connectionless virtual private network including service nodes and links between the service nodes, wherein one or more of the service nodes are also edge nodes, each edge node at a customer endpoint;
receiving logical connectivity data for the edge nodes;
creating a restricted topology in response to the physical connectivity data and to the logical connectivity data, wherein the restricted topology includes a single path between each pair of the edge nodes and wherein each path includes a plurality of the service nodes and one or more of the links;
calculating a bandwidth requirement for each link in the restricted topology;
reserving the bandwidth requirement on each link in the virtual private network; and
directing routing software to force a packet received from one of the edge nodes through one of the paths in the restricted topology.

22. A computer-readable medium encoded with computer executable instructions for directing network hardware to perform a computer executable method comprising:
receiving physical connectivity data for a connectionless virtual private network including service nodes and links between the service nodes, wherein one or more of the service nodes are also edge nodes, each edge node at a customer endpoint;
receiving logical connectivity data for the edge nodes;
creating a restricted topology in response to the physical connectivity data and to the logical connectivity data, wherein the restricted topology includes a single path between each pair of the edge nodes and wherein each path includes a plurality of the service nodes and one or more of the links;
calculating a bandwidth requirement for each link in the restricted topology;
reserving the bandwidth requirement on each link in the virtual private network; and
directing routing software to force a packet received from one of the edge nodes through one of the paths in the restricted topology.

23. The computer readable medium of claim 22 encoded with computer executable instructions for directing network hardware to perform the computer executable method wherein the service nodes include one or more of an Ethernet switch, a core router, an edge router, a tandem gateway and a tandem switch.

* * * * *